(12) United States Patent
Dinh

(10) Patent No.: US 7,439,443 B2
(45) Date of Patent: Oct. 21, 2008

(54) MOUNTING BRACKET FOR ELECTRICAL BOX

(75) Inventor: Cong Thanh Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/703,297

(22) Filed: Feb. 7, 2007

(65) Prior Publication Data

US 2007/0187402 A1  Aug. 16, 2007

Related U.S. Application Data

(60) Provisional application No. 60/773,422, filed on Feb. 15, 2006.

(51) Int. Cl.
*H01H 9/02* (2006.01)

(52) U.S. Cl. .................... 174/58; 174/481; 174/61; 174/57; 220/3.9; 248/906

(58) Field of Classification Search ............. 174/50, 174/53, 57, 58, 480, 481, 503, 61, 62, 63, 174/54; 220/3.2–3.9; 248/906, 300, 343, 248/200

See application file for complete search history.

(56) References Cited

U.S. PATENT DOCUMENTS

| | | | |
|---|---|---|---|
| 2,042,620 A | 6/1936 | Noyes | |
| 4,135,337 A | 1/1979 | Medlin | |
| 4,533,060 A * | 8/1985 | Medlin | 220/3.9 |
| 4,569,458 A * | 2/1986 | Horsley | 248/906 |
| 4,572,391 A | 2/1986 | Medlin | |
| 4,603,789 A | 8/1986 | Medlin, Sr. | |
| 4,688,693 A | 8/1987 | Medlin, Jr. | |
| 4,757,908 A | 7/1988 | Medlin, Sr. | |
| 4,964,525 A * | 10/1990 | Coffey et al. | 248/906 |
| 5,025,944 A | 6/1991 | Rodick | |
| 5,221,814 A | 6/1993 | Colbaugh et al. | |
| 5,234,119 A | 8/1993 | Jorgensen et al. | |
| 5,263,676 A | 11/1993 | Medlin, Jr. et al. | |
| 5,380,951 A * | 1/1995 | Comerci et al. | 174/503 |
| 5,450,974 A | 9/1995 | Lippa | |
| 5,595,362 A * | 1/1997 | Rinderer et al. | 220/3.9 |
| 5,646,371 A | 7/1997 | Fabian | |
| 5,841,068 A | 11/1998 | Umstead et al. | |
| 5,965,844 A | 10/1999 | Lippa | |
| 6,147,304 A | 11/2000 | Doherty | |
| 6,323,424 B1 * | 11/2001 | He | 174/58 |

(Continued)

*Primary Examiner*—Angel R Estrada
(74) *Attorney, Agent, or Firm*—Hoffmann & Baron, LLP

(57) ABSTRACT

A mounting bracket for an electrical box that includes: a base plate having substantially planar top and bottom surfaces, a first side, a second side, a first end, a second end, a plurality of mounting screw apertures and an opening for receiving an electrical box; a first flange and a second flange connected to the first and second sides, respectively, of the base plate by a first flange neck and a second flange neck, wherein each flange has a top and a bottom flange surface, wherein the flange necks extend from the top surface of the base plate; a wall connected to the first end having a substantially flat outer wall surface and a pair of opposing ends, wherein the wall extends from the bottom surface of the base plate; and a tab connected to each opposing end of the wall, wherein the tabs are substantially perpendicular to the outer surface of the wall.

18 Claims, 10 Drawing Sheets

U.S. PATENT DOCUMENTS 6,452,813 B1 9/2002 Gretz
6,749,162 B2 6/2004 Nicolides et al.
7,109,414 B2 9/2006 Reynolds

* cited by examiner

MOUNTING BRACKET FOR ELECTRICAL BOX

This application claims priority from provisional applications Ser. No. 60/773,422, filed on Feb. 15, 2006 which is incorporated herein in its entirety.

FIELD OF THE INVENTION

The present invention is a mounting bracket for an electrical box. In particular, the present invention relates to a mounting bracket for an electrical box that provides additional support when the bracket is mounted to a stud.

BACKGROUND OF INVENTION

An electrical box provides an enclosure for an electrical receptacle as well as a termination point for wires carrying electrical current. Wiring entering an electrical box is typically connected to an electrical fixture or receptacle, such as a plug outlet or switch. The box can then be covered by a face plate having an opening, which allows access to the outlet or switch while preventing electrified components from being exposed. For most applications, the electrical box is surface mounted with the wiring to the box concealed in a wall or ceiling. In such applications, the electrical box is typically secured to a structural member, such as a wall stud or ceiling joist, in order to support the box. The support member must be able to withstand the forces exerted on the box and prevent movement of the box under situations such as the repeated insertion and removal of a plug or the operation of a switch. Alternatively, electrical boxes may be used in exposed-conduit wiring installations where they are mounted to the exterior of a wall, column or ceiling.

In conventional construction, electrical boxes mounted within a wall are typically secured directly to studs either by screws or nails. The wall material, such as gypsum board drywall, is then installed on the studs to form the planar wall surface. In many applications, including interior walls of a structure, both sides of the studs are covered by wall board. The studs can be made of various materials including wood, steel and man-made composite materials. Wooden studs are traditionally used in residential construction and steel studs are commonly used in the construction of commercial buildings. Prior designs typically use at least two fasteners, such as a screw or a nail, which are inserted through openings in the sidewall of the electrical box so that the box can be attached to the stud.

The electrical box must be properly positioned in relation to the stud itself and the outer covering which is later placed over the stud. When the outer covering placed on the stud is a gypsum board material, the electrical box must be positioned so that it is properly recessed within the outer covering to allow for the electrical box to be accessed and so that the front of the electrical box is aligned with the surface of the outer covering. Prior art electrical boxes that attach directly to a stud are difficult to align and the front of the box often does not align with the outer wall covering. To facilitate the alignment of these electrical boxes, a variety of different brackets have been used. An electrical box is mounted in these brackets either before or after the bracket is attached to a stud. Typically, these brackets have special mounting features designed to facilitate the attachment of the bracket to a stud. However, many of these brackets and their mounting features are cumbersome and cannot be quickly and easily attached to a stud.

Accordingly, it is desirable to provide a mounting bracket for an electrical box which facilitates the attachment of the box to a stud. There is also a further need for an electrical box which assists the user in properly positioning the outlet for attachment so that the electrical box can be installed more easily and in a more cost efficient manner.

SUMMARY OF THE INVENTION

In accordance with the present invention, a mounting bracket for an electrical box is provided. The mounting bracket includes: a base plate having substantially planar top and bottom surfaces, a first side, a second side, a first end, a second end, a plurality of mounting screw apertures and an opening for receiving an electrical box; a first flange and a second flange connected to the first and second sides, respectively, of the base plate, wherein each flange has a top and a bottom flange surface; a wall connected to the first end having substantially flat inner and outer wall surfaces, a central portion and a pair of opposing ends, wherein the wall extends from the bottom surface of the base plate; and a tab connected to each opposing end of the wall, wherein the tabs extend away from the wall and are substantially perpendicular to the outer surface of the wall.

The plurality of mounting screw apertures are arranged to accommodate electrical boxes of different sizes and orientations and having different mounting tab locations. The base plate can also have a plurality of mounting slots which are used either alone or in combination with the plurality of mounting screw apertures to accommodate electrical boxes of different sizes and orientations and having different mounting tab locations.

In a preferred embodiment, the top surfaces of the first and second flanges are substantially parallel to the top surface of the base plate. The first and second flanges are preferably connected to the first and second sides of the base plate by a first flange neck and a second flange neck, wherein the flange necks extend from the top surface of the base plate. In another embodiment, the opposing ends of the wall extend beyond the sides of the base plate and/or beyond the flange necks and also extend beyond the central portion to define a notch in the wall. In a preferred embodiment, instead of the notch, the wall has a wall opening for accessing the electrical box mounted in the bracket. Each of the flanges can have one or more flange mounting screw apertures for attaching the bracket to a stud using mounting screws or nails. In addition, each of the tabs can have one or more tab mounting screw apertures for attaching the bracket to a stud using mounting screws or nails.

The mounting bracket can have a second wall or a stiffening member connected to the second end of the base plate to minimize bending or flexing of the base plate. The second wall is substantially the same as the wall connected to the first end of the base plate and has a substantially flat outer wall surface, a central portion, a pair of opposing ends and a pair of tabs connected to the opposing ends and perpendicular to the outer wall surface. When a stiffening member is used instead of a second wall, the distal ends extend beyond the flange and/or the sides of the base plate to a point that is substantially coplanar with the tabs. When the bracket is mounted to a stud, the tabs on one end of the two walls or the tab on one wall and the distal end of the stiffening member contact the side of the stud. Preferably, the second wall or the stiffening member extends from the bottom surface of the base plate and is substantially parallel to the wall on the first end of the bracket.

The preferred embodiments of the mounting bracket of the present invention, as well as other objects, features and advantages of this invention, will be apparent from the following detailed description, which is to be read in conjunction with the accompanying drawings.

BRIEF DESCRIPTION OF THE FIGURES

Objects and attendant features of this invention will be readily appreciated as the invention becomes better understood by reference to the accompanying drawings, wherein.

DETAILED DESCRIPTION OF THE INVENTION

The present invention is a mounting bracket for an electrical box, which is used to attach the electrical box to a structure, typically a wall stud. The bracket includes a base plate that has a front surface with an opening for receiving the electrical box and a plurality of apertures and/or slots for securing the electrical box to the bracket using screws or other fastening means. The electrical box can be mounted in the bracket either before or after the bracket is attached to a structure. The bracket also includes a pair of flanges on either side of the base plate, which are used to attach the bracket to a structure. The flanges are connected to the opposing sides of the base plate by flange necks which, in this embodiment, extend upwardly and outwardly from the sides of the base plate, preferably at about a 45-degree angle. The flanges are connected to the flange necks so that the plane formed by the surfaces of the flanges is parallel to, and also preferably offset from, the plane formed by the front surface of the base plate. The flanges have mounting screw holes that are used to attach the bracket to a structure. The bracket can also have mounting screw holes in the flange necks that can extend to the base plate and/or the face of the flange. These holes allow screws or nails to be inserted into a wall stud at an angle, preferably about a 45-degree angle.

The mounting bracket has a wall extending from at least one of the ends of the base plate. The wall has a pair of opposing ends and each end extends beyond the corresponding flange neck and bends outwardly, i.e., away from the base plate, to form a tab. The tabs on the opposing ends of the wall can have a mounting screw aperture that can be used to secure the bracket to a structure, preferable the side wall of a stud. When the bracket is positioned on a wall stud, one of the flanges contacts the front surface of the wall stud and one of the tabs contacts the side surface of the wall stud. Because the tabs extend beyond the flange necks, the flange necks do not contact the wall stud. The wall also has a notch in the central portion that is defined by the opposing ends. The notch provides clearance for cables and/or wires that are connected to the box.

In those embodiments of the present invention in which a wall extends from only one end of the base plate, the other end of the base plate can have a stiffening member, which extends from the base plate in the same direction as the wall and which helps prevent the base plate from flexing. Preferably, the stiffening member extends along the entire end of the base plate (including the flange necks) and the surface of the stiffening member is substantially parallel to the surface of the wall on the other end of the base plate.

Figure 1:
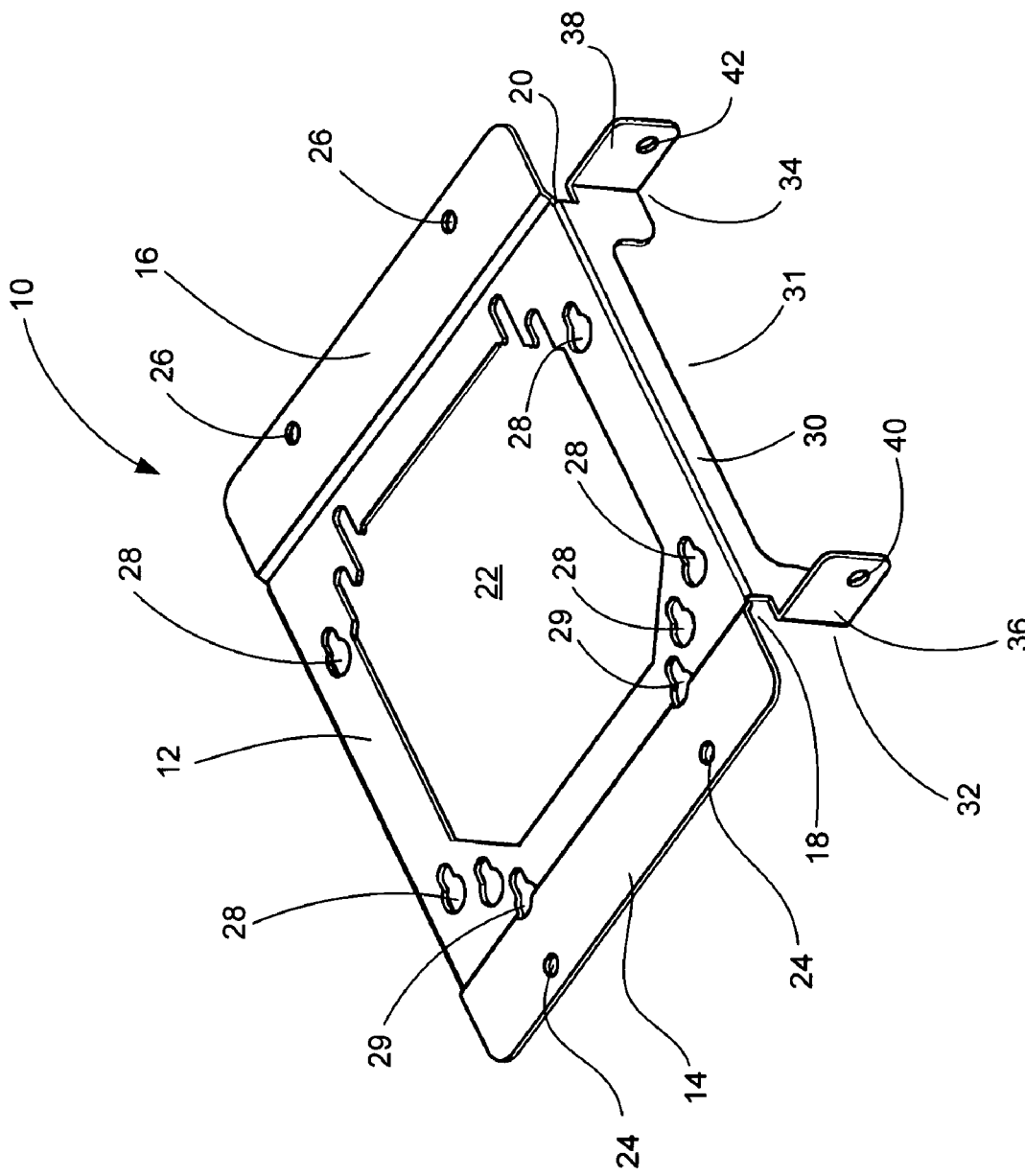
FIG. 1 is a front peripheral view of a first embodiment of the mounting bracket.
Figure 3:
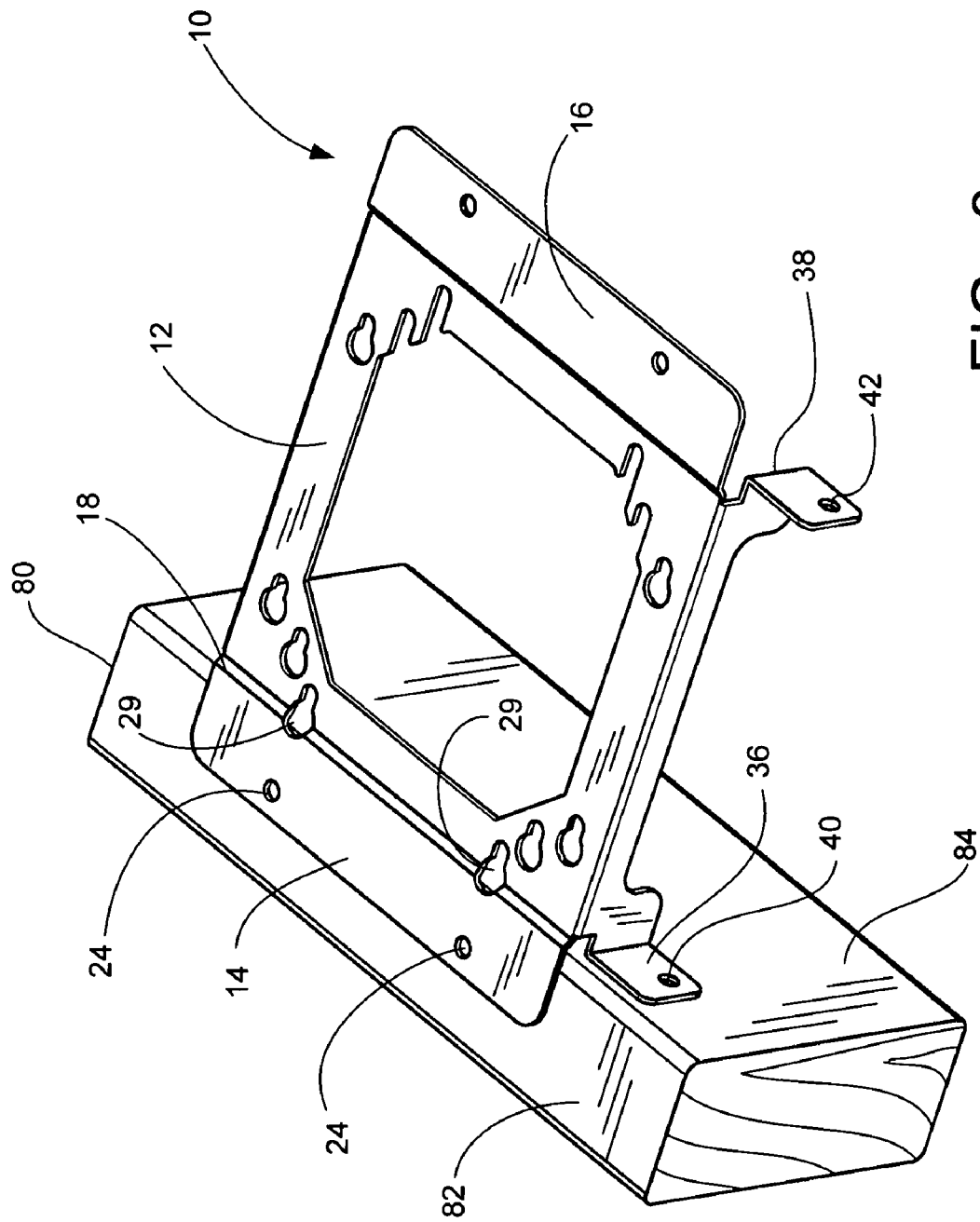
FIG. 3 is a front peripheral view of a first embodiment of the mounting bracket attached to a stud.
Figure 4:
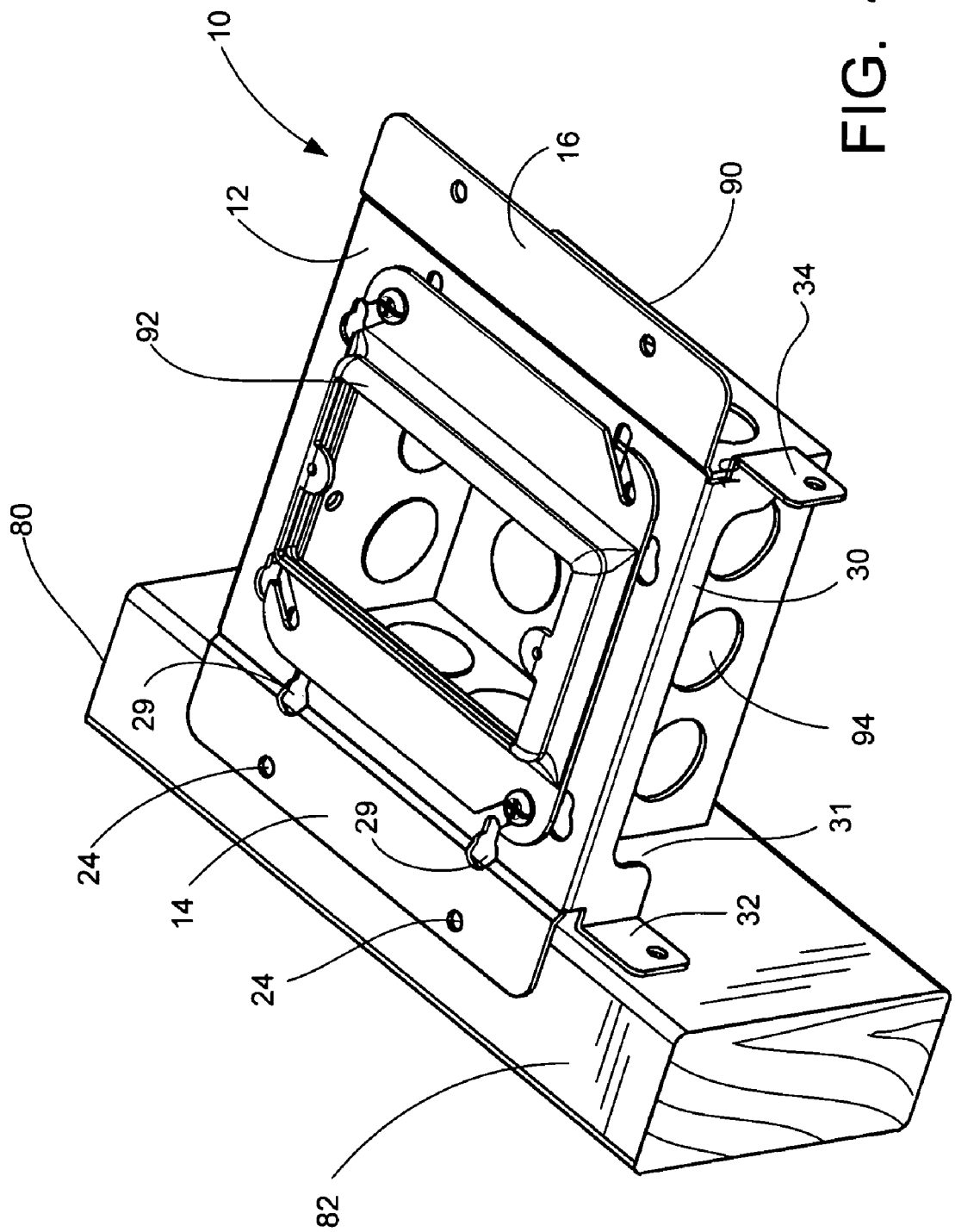
FIG. 4 is a front peripheral view of a first embodiment of the mounting bracket attached to a stud with an electrical box installed in the bracket.

FIG. 1 shows a front perspective view of a first embodiment of the mounting bracket 10 used for an electrical box 90 (see FIG. 4). The bracket 10 includes a base plate 12 with flanges 14, 16 connected to the opposing sides by flange necks 18, 20. The surfaces of the flanges 14, 16 are parallel to, and also preferably offset from (but not necessarily), the plane formed by the surface of the base plate 12 and include a plurality of holes or apertures 24, 26 for securing the bracket 10 to a structure, preferably a wall stud 80 (see FIG. 3). In this fashion, either side of the bracket 10 may be mounted to the stud. The surface of the base plate 12 is, preferably, recessed from the surfaces of the flanges 14, 16 so that the mounting surface of a cover plate 92 (see FIG. 4) attached to the electrical box 90 will not extend beyond the surfaces of the flanges 14, 16.

The first embodiment of the bracket 10 also has a wall 30 which extends from at least one of the ends of the base plate 12. Its direction is opposite to the preferred offset of flanges 14, 16 from bracket 10. The wall 30 has a pair of opposing ends 32, 34 which extend beyond the flange necks 18, 20. At the distal projection of ends 32, 34, there are a pair of tabs 36, 38 which are bent outwardly, away from the base plate 12 and which are substantially perpendicular to the wall 30. The tabs 36, 38 have mounting screw holes 40, 42 for attaching the bracket 10 to a stud 80 (see FIG. 3). In this embodiment, the wall 30 has a notch 31 that is defined by the opposing ends 32, 34. The notch 31 facilitates the entry of conduits and/or wires into the electrical box 90 (FIG. 4). In those embodiments where a second wall (not shown) is provides, the second wall is connected to the second end of the base plate 12 and is substantially identical to the first wall.

The base plate 12 for the first embodiment of the bracket 10 has an opening 22 for receiving an electrical box 90 (see FIG. 4) and a plurality of mounting screw apertures 28, preferably round holes, keyholes or slots, for securing different size electrical boxes 90 to the bracket 10. It should be noted that typical electrical boxes are either 4-inch square boxes or 4-11/16-inch square boxes. Each box size comes with mounting tabs whose spacing and position are industry specified. For the smaller 4-inch square box, the box itself can be rotated 90 degrees and yet the mounting tab locations will remain unchanged. This is not the case for the larger 4-11/16-inch box. If that box were rotated 90 degrees, the mounting tab locations would be different. Hence, as shown in FIG. 1, the center slot/keyhole 28 in each corner of opening 22 is provided for securing the smaller 4-inch box to bracket 10 regardless of whether the box is rotated 90 degrees or not. In contrast, the outer two slots/keyholes 28 in base plate 12 are provided for securing the larger 4-11/16-inch box to bracket 10, one set being used when the box is oriented one way and the other set being used when this larger box is rotated 90 degrees. Thus, with bracket 10, not only can multiple size boxes be attached thereto, but the orientations of these boxes can also vary and yet bracket 10 will still provide mounting screw apertures 28 that will be properly aligned with the box's mounting tabs.

The plurality of mounting screw apertures 28 provide means for mounting electrical boxes of different sizes with different mounting tab locations in a variety of different orientations.

Different embodiments of the invention can have different size openings 22 to accommodate a variety of different electrical boxes 90 having different dimensions. The bracket 10 can also include one or more mounting holes 29 in the flange necks 18, 20 for either securing box 90 to bracket 10 or for securing the bracket 10 to a stud 80 (see FIG. 4) with either screws or nails. These mounting holes 29 can encompass the base plate 12 and the flanges 14, 16.

Figure 2:
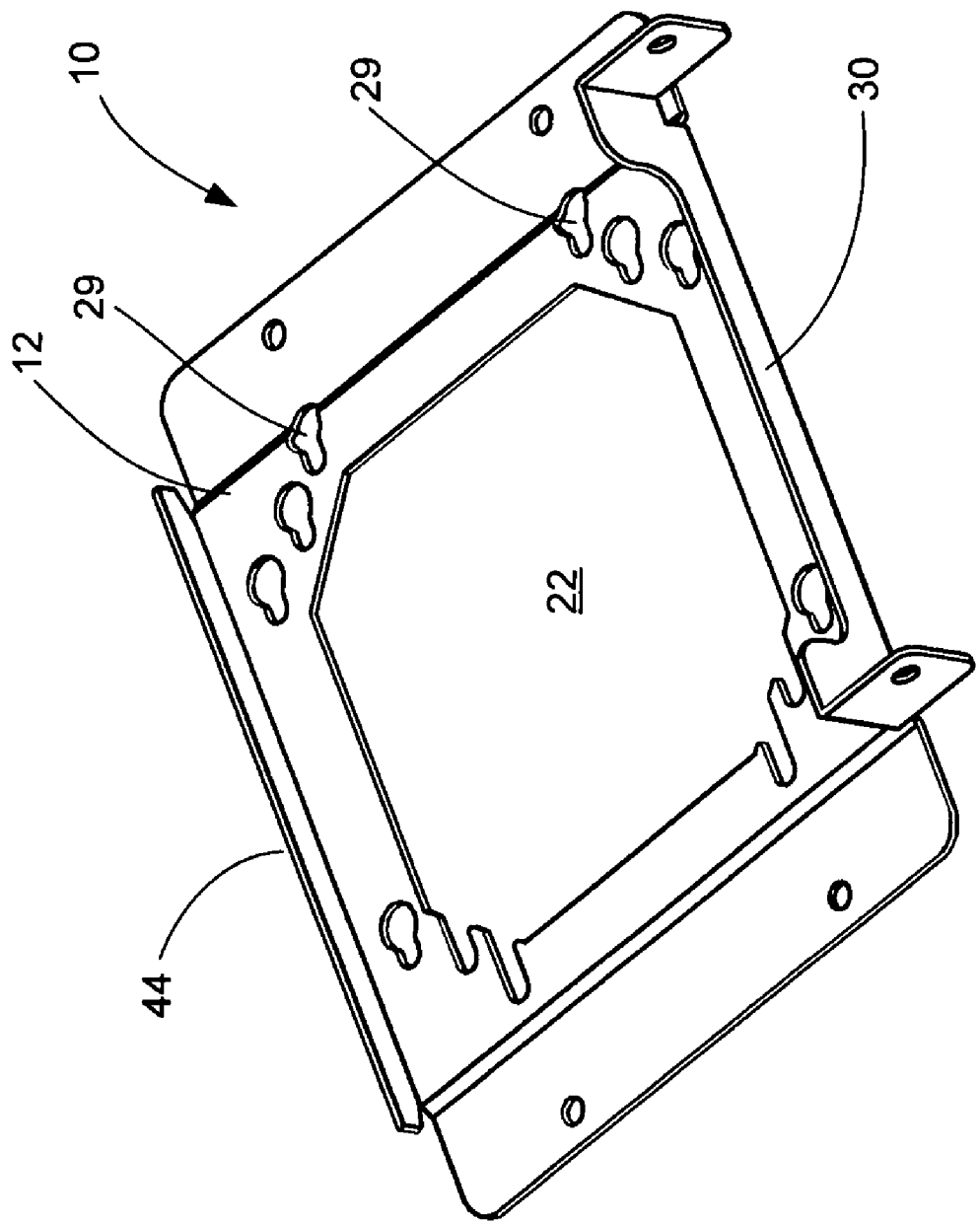
FIG. 2 is a rear peripheral view of a first embodiment of the mounting bracket.

FIG. 2 shows a rear perspective view of the first embodiment of the bracket 10 with a stiffening member 44 extending from the base plate 12 on the opposing side of the base plate 12 from the wall 30. The stiffening member 44 helps prevent the base plate 12 from twisting and/or distorting when an electrical box 90 (FIG. 4) is mounted in the bracket 10. Further, the distal ends of stiffening member 44 extend beyond flange necks 18, 20. In a preferred embodiment of the invention, in place of the stiffening member 44, the bracket 10 has a second wall (not shown) connected to the second end of the base plate 12, which can be used to secure the bracket 10 to a structure and which further stiffens the base plate 12.

FIG. 3 is a front peripheral view of the first embodiment of the mounting bracket 10 attached to a wall stud 80. Due to its configuration, either side of bracket 10 could be mounted so as to project from either side of stud 80. In FIG. 3, the flange 14 on one side of the bracket 10 contacts the front 82 of the stud 80 and the tab 36 on the same side of the bracket 10 contacts the side 84 of the stud 80 while at the same time, the distal end of the stiffening member 44 also contacts side 84 of stud 80. Attaching the bracket 10 to two surfaces 82, 84 of the stud 80 securely holds the bracket 10 in place. Mounting holes 29 can also be used to attach the bracket 10 to the stud 80. In the embodiment shown in FIG. 3, the mounting holes 29 extend across the base plate 10, the flange neck 18 and the flange 14 so that, if desired, the mounting screws or nails can be inserted into the stud 80 at an angle. Further, as previously noted, flange neck 18 does not contact stud 80, contact being made by flange 14, tab 36 and a distal end of stiffening member 44.

FIG. 4 is a front peripheral view of the first embodiment of the mounting bracket 10 attached to a stud 80 with an electrical box 90 installed in the bracket 10. The flanges 14, 16 on either side of the bracket 10 allow the box 90 to be mounted on either side of the stud 80. Thus, this assembly could be rotated 180 degrees so that the electrical box 90 is inverted and flange 16 contacts the front 82 of the stud 80. This is especially useful when the electrical box 90 is factory installed in the bracket 10 and obviates the need to remove the electrical box 90 and reposition it in the bracket 10. FIG. 4 also shows a cover plate 92 on the electrical box 90. After the cover 92 is attached to the box 90, the surface of the cover is approximately even with the surfaces of the flanges 14, 16. The notch 31 in the wall 30 of the bracket 10 provides unrestricted access to the apertures 94 in the electrical box 90.

Figure 5:
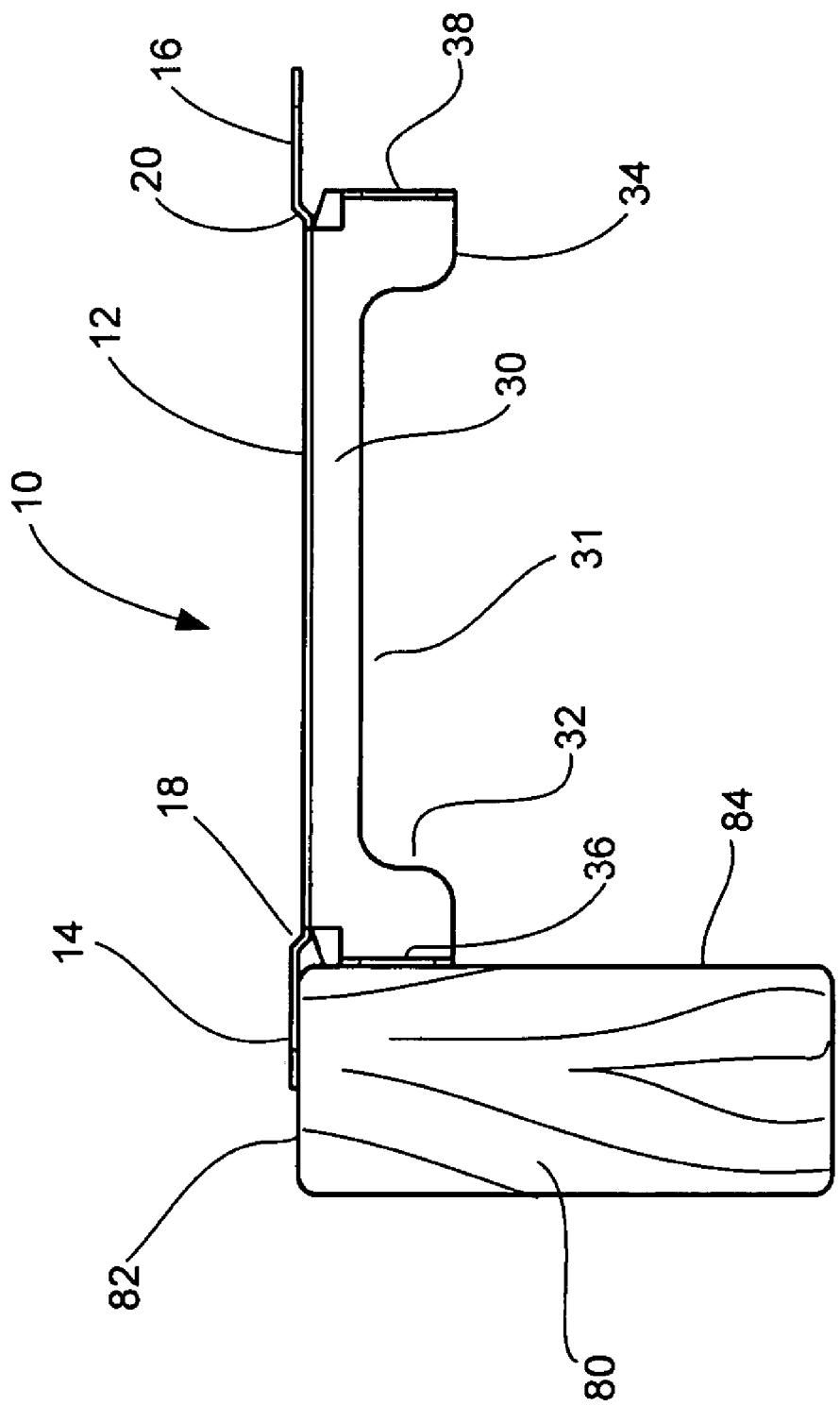
FIG. 5 is a side view of a first embodiment of the mounting bracket in FIG.3.

FIG. 5 is a side view of the first embodiment of the mounting bracket 10 positioned on a wall stud 80. The flange 14 contacts the front 82 of the stud 80 and the tab 36 contacts the side 84 of the stud 80 while a distal end of stiffening member 44 also contacts side 84 of stud 80 all so as to securely attach the bracket to the stud 80. The opposing ends 32, 34 of the wall 30 and the distal ends of stiffening member 44 extend beyond the flange necks 18, 20 so that flange neck 18 does not contact the stud 80 when the flange 14, tab 36, and stiffening member 44 are in contact with the stud 80. FIG. 5 also illustrates the notch 31 in wall 30 which is defined by the opposing ends 32, 34 of the wall 30. Tabs 36, 38 are substantially perpendicular to wall 30 and extend away from the base plate 12. When an electrical box 90 (FIG. 4) is mounted in the bracket, any force exerted on the base plate 12 is transferred to the stud 80 by the tab 36 and/or flange 14 and/or stiffening member 44 so that the bracket 10 will maintain its position.

Figure 6:
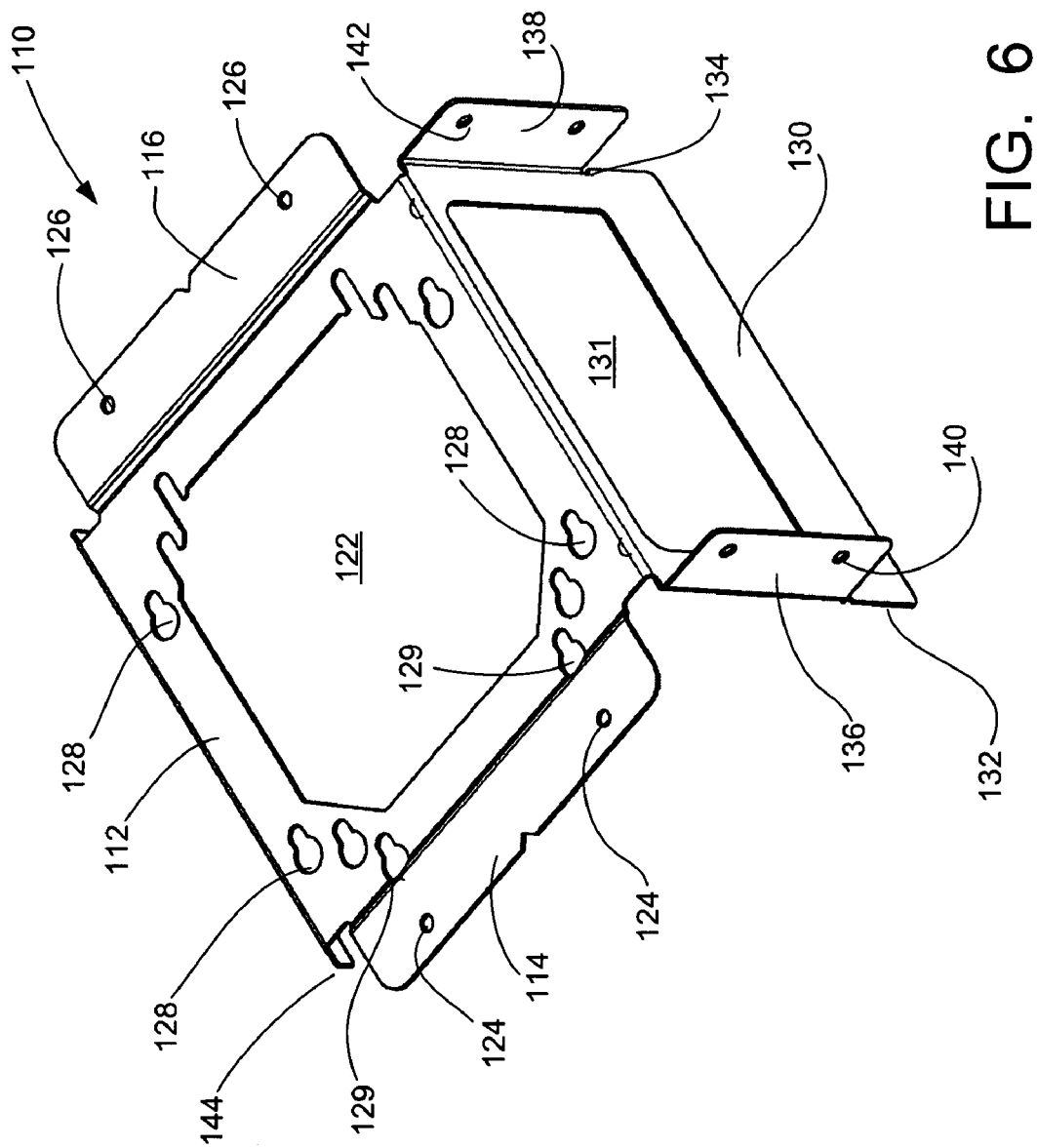
FIG. 6 is a front peripheral view of a second embodiment of the mounting bracket.
Figure 8:
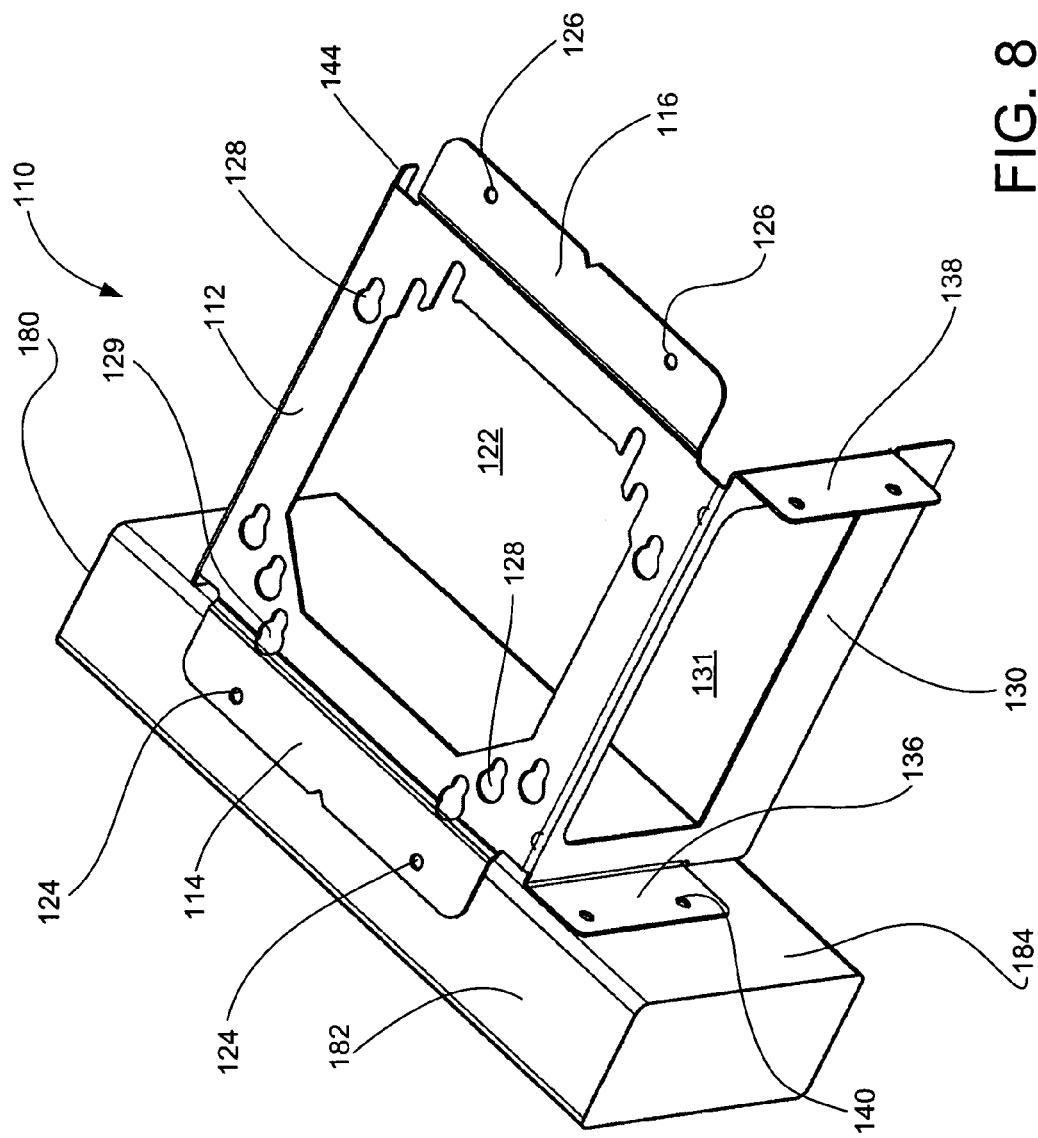
FIG. 8 is a front peripheral view of a second embodiment of the mounting bracket attached to a stud.
Figure 9:
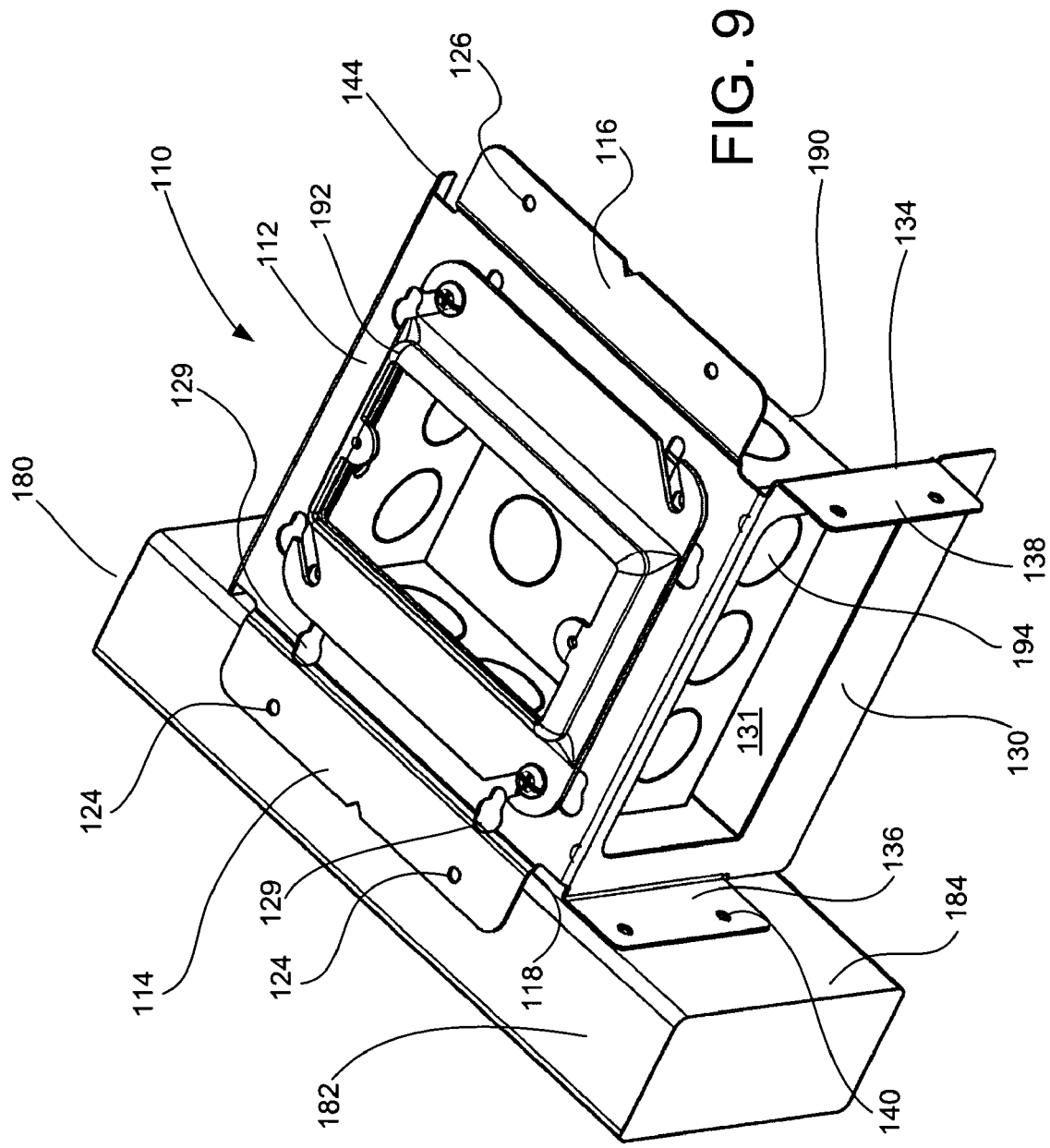
FIG. 9 is a front peripheral view of a second embodiment of the mounting bracket attached to a stud with an electrical box installed in the bracket.

FIG. 6 shows a front perspective view of a second embodiment of the mounting bracket 110 used for an electrical box 190 (see FIG. 9). The bracket 110 includes a base plate 112 with flanges 114, 116 connected to the opposing sides by flange necks 118, 120. The surfaces of the flanges 114, 116 are parallel to, and also preferably offset from (but not necessarily), the plane formed by the surface of the base plate 112 and include a plurality of holes 124, 126 for securing the bracket 110 to a structure, preferably a wall stud 180 (see FIG. 8). In this fashion, either side of bracket 110 may be mounted to the stud. The surface of the base plate 112 is, preferably, recessed from the surfaces of the flanges 114, 116 so that the mounting surface of a cover plate 192 (see FIG. 9) attached to the electrical box 190 will not extend beyond the surfaces of the flanges 114, 116.

The second embodiment of the bracket 110 also has a wall 130 which extends from at least one of the ends of the base plate 112. Its direction is opposite to the preferred offset of flanges 114, 116 from bracket 110. The wall 130 has a pair of opposing ends 132, 134 which extend beyond the flange necks 118, 120. At the distal projection of ends 132, 134, there are a pair of tabs 136, 138 which are bent outwardly, away from the base plate 112 and which are substantially perpendicular to the wall 130. The tabs 136, 138 have mounting screw holes or apertures 140, 142 for attaching the bracket 110 to a structure, such as a stud 180 (see FIG. 8). In this embodiment, the wall 130 has an opening 131 which facilitates the entry of conduits and/or wires into the electrical box 190 (FIG. 9).

The base plate 112 for the second embodiment of the bracket 110 has an opening 122 for receiving an electrical box 190 (see FIG. 9) and a plurality of mounting screw apertures 128, preferably keyholes or slots, for securing different size electrical boxes 190 to the bracket 110. Different embodiments of the invention can have different size openings 122 to accommodate a variety of different electrical boxes 190 having different dimensions. The bracket 110 can also include one or more mounting holes or apertures 129 in the flange necks 118, 120 for either securing box 190 to bracket 110 or for securing the bracket 110 to a stud 180 (see FIG. 9) with either screws or nails. These mounting holes 129 can encompass to the base plate 112 and the flanges 114, 116.

Figure 7:
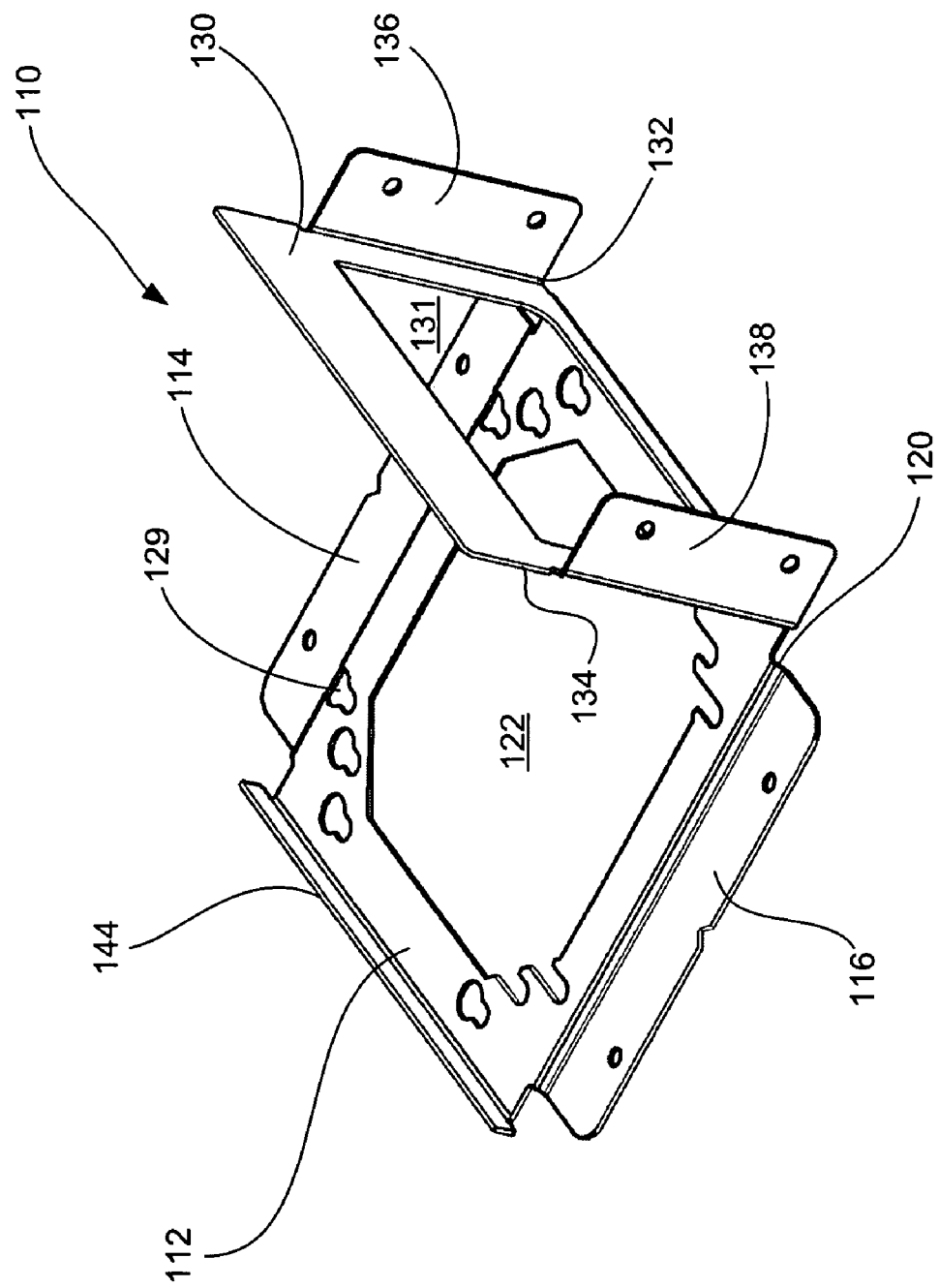
FIG. 7 is a rear peripheral view of a second embodiment of the mounting bracket.

FIG. 7 shows a rear perspective view of the second embodiment of the bracket 110 with a stiffening member 144 extending from the base plate 112 on the opposing side of the base plate 112 from the wall 130. The stiffening member 144 helps prevent the base plate 112 from twisting and/or distorting when an electrical box 190 (FIG. 9) is mounted in the bracket 110. Further, the distal ends of stiffening member 144 extend beyond flange necks 118, 120. In a preferred embodiment of the invention, in place of the stiffening member 144, the bracket 110 has a second wall (not shown) connected to the second end of the base plate 112, which can be used to secure the bracket 110 to a structure and which further stiffens the base plate 112.

FIG. 8 is a front peripheral view of the second embodiment of the mounting bracket 110 attached to a wall stud 180. Due to its configuration, either side of bracket 110 could be mounted so as to project from either side of stud 80. In FIG. 3, the flange 114 on one side of the bracket 110 contacts the front 182 of the stud 180 and the tab 136 on the same side of the bracket 110 contacts the side 184 of the stud 180 while at the same time the distal end of the stiffening member 144 also contacts side 184 of stud 180. Attaching the bracket 110 to two surfaces 182, 184 of the stud 180 securely holds the bracket 110 in place. Mounting holes 129 can also be used to attach the bracket 110 to the stud 180. In the embodiment shown in FIG. 8, the mounting holes 129 extend across the base plate 110, the flange neck 118 and the flange 114 so that mounting screws or nails can be inserted into the stud 180 at an angle if so desired. Further, flange neck 118 does not contact stud 180, contact being made by flange 114, tab 136 and a distal end of stiffening member 144.

FIG. 9 is a front peripheral view of the second embodiment of the mounting bracket 110 attached to a stud 180 with an electrical box 190 installed in the bracket 110. The flanges 114, 116 on either side of the bracket 110 allow the box 190 to be mounted on either side of the stud 180, thus this assembly could be rotated 180 degrees so that the electrical box 190 is inverted and flange 116 contacts the front 182 of the stud 180. This is especially useful when the electrical box 190 is factory installed in the bracket 110 and obviates the need to remove the electrical box 90 and reposition it in the bracket 10. FIG. 9 also shows a cover plate 192 on the electrical box 10. After the cover 192 is attached to the box 190, the surface of the cover is approximately even with the surfaces of the flanges 114, 116. The opening 131 in the wall 130 of the bracket 110 provides unrestricted access to the apertures 194 in the electrical box 190.

Figure 10:
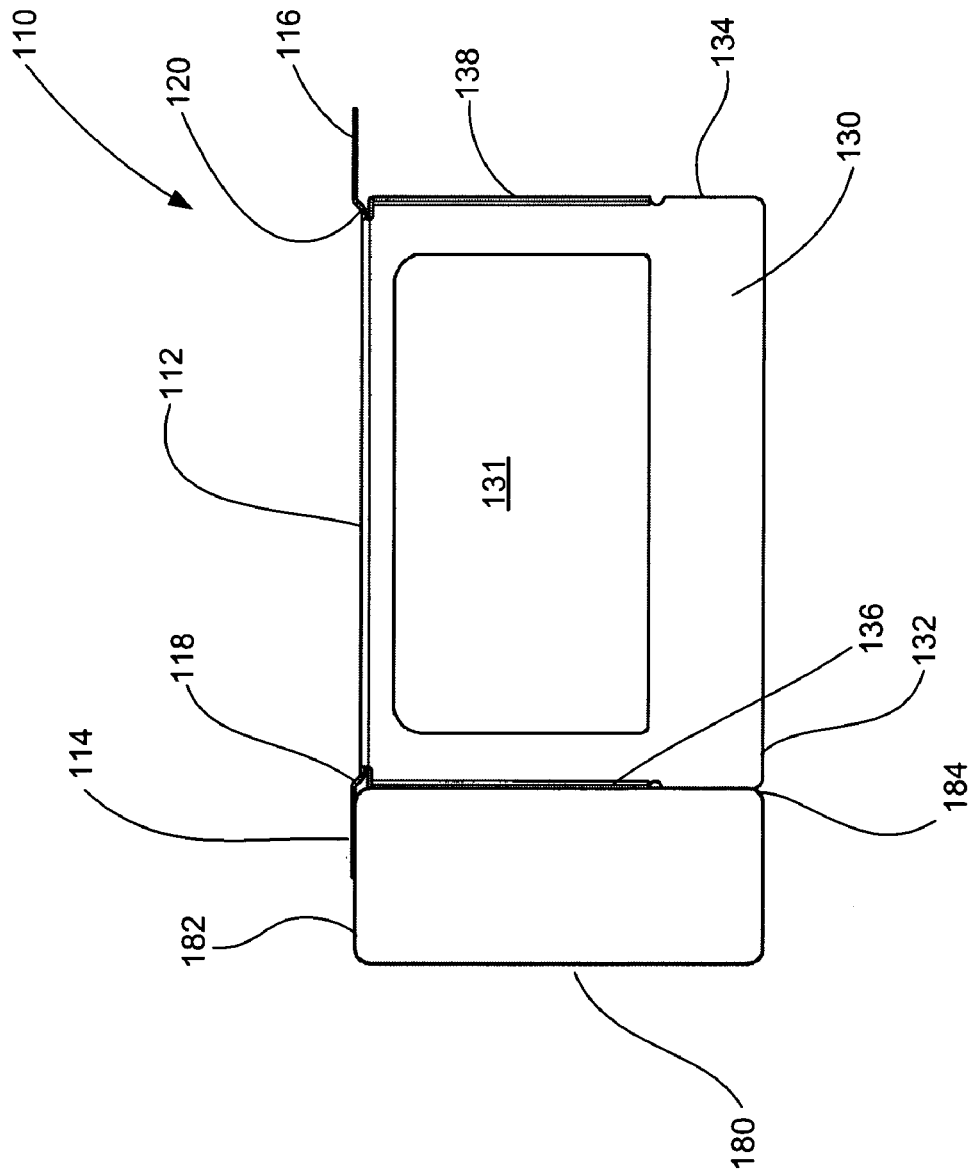
FIG. 10 is a side view of a second embodiment of the mounting bracket in FIG. 8.

FIG. 10 is a side view of the second embodiment of the mounting bracket 110 positioned on a wall stud 180. The flange 114 contacts the front 182 of the stud 180 and the tab 136 contacts the side 184 of the stud 180 while a distal end of stiffening member 144 also contacts side 184 of stud 180 all so as to securely attach the bracket to the stud 180. The opposing ends 132, 134 of the wall 130 and the distal ends of stiffening member 144 extend beyond the flange necks 118, 120 so that flange neck 118 does not contact the stud 180 when the flange 114, tab 136, and stiffening member 144 are in contact with the stud 180. FIG. 10 also illustrates the opening 131 in the wall 130. Tabs 136, 138 are substantially perpendicular to wall 130 and extend away from the base plate 112. When an electrical box 190 (FIG. 9) is mounted in the bracket, any force exerted on the base plate 112 is transferred to the stud 180 by the tab 136 and/or flange 114 and/or stiffening member 144 so that the bracket 110 will maintain its position.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

I claim:

1. A mounting bracket for an electrical box comprising:
   a base plate having substantially planar top and bottom surfaces, a first side, a second side, a first end, a second end, a plurality of mounting screw apertures and an opening for receiving an electrical box;
   a first flange and a second flange connected to the first and second sides, respectively, of the base plate by a first flange neck and a second flange neck, wherein each flange has a top and a bottom flange surface;
   a wall connected to the first end having a substantially flat outer wall surface, a central portion and a pair of opposing ends, wherein the wall extends from the bottom surface of the base plate;
   a tab extending from each opposing end of the wall, wherein the tabs are substantially perpendicular to the outer surface of the wall and wherein the tabs extend beyond the flange necks; and
   a second wall or a stiffening member connected to the second end of the base plate and extending from the bottom surface of the base plate, the second wall or stiffening member having distal ends that extend beyond the flange necks and are co-planar with the tabs.

2. The mounting bracket for an electrical box according to claim 1, wherein the top surfaces of the first and second flanges are offset from and are substantially parallel to the top surface of the base plate.

3. The mounting bracket for an electrical box according to claim 1, wherein the opposing ends of the wall extend beyond the central portion and define a notch in the wall.

4. The mounting bracket for an electrical box according to claim 1, wherein each of the flanges has one or more flange mounting screw apertures.

5. The mounting bracket for an electrical box according to claim 1, wherein each of the tabs has one or more tab mounting screw apertures.

6. The mounting bracket for an electrical box according to claim 1, wherein the plurality of mounting screw apertures are arranged to accommodate electrical boxes of different sizes and orientations and having different mounting tab locations.

7. The mounting bracket for an electrical box according to claim 1, wherein the base plate has a plurality of mounting slots and wherein the plurality of mounting slots and the plurality of mounting screw apertures are arranged to accommodate electrical boxes of different sizes and orientations and having different mounting tab locations.

8. A mounting bracket for an electrical box comprising:
   a base plate having substantially planar top and bottom surfaces, a first side, a second side, a first end, a second end, a plurality of mounting screw apertures and an opening for receiving an electrical box;
   a first flange and a second flange connected to the first and second sides, respectively, of the base plate, wherein each flange has a top and a bottom flange surface;
   a wall connected to the first end having a substantially flat outer wall surface, a central portion and a pair of opposing ends, wherein the wall extends from the bottom surface of the base plate;
   a tab connected to each opposing end of the wall, wherein the tabs are substantially perpendicular to the outer surface of the wall, and wherein the tabs extend beyond the sides of the base plate; and
   a second wall or a stiffening member connected to the second end of the base plate and extending from the bottom surface of the base plate, the second wall or stiffening member having distal ends that extend beyond the sides of the base plate and are co-planar with the tabs.

9. The mounting bracket for an electrical box according to claim 8, wherein the top surfaces of the first and second flanges are substantially parallel to the top surface of the base plate.

10. The mounting bracket for an electrical box according to claim 8, wherein the opposing ends of the wall extend beyond the central portion and define a notch in the wall.

11. The mounting bracket for an electrical box according to claim 8, wherein each of the flanges has one or more flange mounting screw apertures and each of the tabs has one or more tab mounting screw apertures.

12. The mounting bracket for an electrical box according to claim 8, wherein the plurality of mounting screw apertures are arranged to accommodate electrical boxes of different sizes and orientations and having different mounting tab locations.

13. The mounting bracket for an electrical box according to claim 8, wherein the base plate has a plurality of mounting slots and wherein the plurality of mounting slots and the plurality of mounting screw apertures are arranged to accommodate electrical boxes of different sizes and orientations and having different mounting tab locations.

14. A mounting bracket for an electrical box comprising:
a base plate having substantially planar top and bottom surfaces, a first side, a second side, a first end, a second end, a plurality of mounting screw apertures and an opening for receiving an electrical box;
a first flange and a second flange connected to the first and second sides, respectively, of the base plate by a first flange neck and a second flange neck, wherein each flange has a top and a bottom flange surface;
a wall connected to the first end having a substantially flat outer wall surface, a wall opening and a pair of opposing ends, wherein the wall extends from the bottom surface of the base plate, and wherein the wall opening is used to access the electrical box mounted in the bracket;
a tab extending from each opposing end of the wall, wherein the tabs are substantially perpendicular to the outer surface of the wall and wherein the tabs extend beyond the flange necks; and
a second wall or a stiffening member connected to the second end of the base plate and extending from the bottom surface of the base plate, the second wall or stiffening member having distal ends that extend beyond the flange necks and are co-planar with the tabs.

15. The mounting bracket for an electrical box according to claim 14, wherein the top surfaces of the first and second flanges are offset from and are substantially parallel to the top surface of the base plate.

16. The mounting bracket for an electrical box according to claim 14, wherein each of the flanges has one or more flange mounting screw apertures and each of the tabs has one or more tab mounting screw apertures.

17. The mounting bracket for an electrical box according to claim 14, wherein the plurality of mounting screw apertures are arranged to accommodate electrical boxes of different sizes and orientations and having different mounting tab locations.

18. The mounting bracket for an electrical box according to claim 14, wherein the base plate has a plurality of mounting slots and wherein the plurality of mounting slots and the plurality of mounting screw apertures are arranged to accommodate electrical boxes of different sizes and orientations and having different mounting tab locations.

* * * * *

UNITED STATES PATENT AND TRADEMARK OFFICE
CERTIFICATE OF CORRECTION

PATENT NO.        : 7,439,443 B2  
APPLICATION NO.   : 11/703297  
DATED             : October 21, 2008  
INVENTOR(S)       : Dinh Page 1 of 1

It is certified that error appears in the above-identified patent and that said Letters Patent is hereby corrected as shown below:

IN THE SPECIFICATION:

| | | |
|---|---|---|
| Column 7, line 22, | now reads: | "the electrical box 90" |
| | should read: | -- the electrical box 190 -- |
| Column 7, line 23, | now reads: | "the bracket 10" |
| | should read: | -- the bracket 110 -- |
| Column 7, line 24, | now reads: | "on the electrical box 10" |
| | should read: | -- on the electrical box 190 -- |

Signed and Sealed this

Third Day of March, 2009

JOHN DOLL  
*Acting Director of the United States Patent and Trademark Office*